US007686688B2

(12) United States Patent
Friedman et al.

(10) Patent No.: US 7,686,688 B2
(45) Date of Patent: Mar. 30, 2010

(54) METHOD, APPARATUS, AND COMPUTER READABLE STORAGE TO DETERMINE AND/OR UPDATE SLOT MACHINE CONFIGURATIONS USING HISTORICAL, AND/OR CURRENT, AND/OR PREDICTED FUTURE DATA

(75) Inventors: Stacy Friedman, Henderson, NV (US); Jon H. Muskin, Blue Bell, PA (US)

(73) Assignee: Olympian Gaming LLC, Beaverton, OR (US)

( * ) Notice: Subject to any disclaimer, the term of this patent is extended or adjusted under 35 U.S.C. 154(b) by 934 days.

(21) Appl. No.: 10/946,366

(22) Filed: Sep. 22, 2004

(65) Prior Publication Data

US 2006/0079310 A1 Apr. 13, 2006

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ............................ 463/25; 463/20; 463/24; 463/29; 463/42

(58) Field of Classification Search .................. 463/16, 463/20, 22, 24, 29, 42, 25

See application file for complete search history.

(56) References Cited

U.S. PATENT DOCUMENTS

| | | | | |
|---|---|---|---|---|
| 5,655,961 | A * | 8/1997 | Acres et al. | 463/27 |
| 6,645,077 | B2 * | 11/2003 | Rowe | 463/42 |
| 6,805,634 | B1 * | 10/2004 | Wells et al. | 463/42 |
| 2002/0137217 | A1 | 9/2002 | Rowe | |
| 2002/0138594 | A1 | 9/2002 | Rowe | |
| 2003/0228912 | A1 | 12/2003 | Wells | |
| 2004/0229699 | A1 * | 11/2004 | Gentles et al. | 463/42 |
| 2004/0248642 | A1 * | 12/2004 | Rothschild | 463/20 |

OTHER PUBLICATIONS

Fier, Next Generation: Downloadable Slot Games, Operations Insight, Jan. 2004, Compton Dancer Consulting.

* cited by examiner

*Primary Examiner*—John M Hotaling, II
*Assistant Examiner*—Adetokunbo Torimiro
(74) *Attorney, Agent, or Firm*—Muskin & Cusick LLC

(57) ABSTRACT

An apparatus, method, and computer readable storage for automatically deciding slot machine configuration changes. Slot machine usage is electronically monitored and ideal settings are determined from the usage. Slot machines can then be updated electronically according to the ideal settings, either automatically or upon operator approval.

4 Claims, 6 Drawing Sheets

METHOD, APPARATUS, AND COMPUTER READABLE STORAGE TO DETERMINE AND/OR UPDATE SLOT MACHINE CONFIGURATIONS USING HISTORICAL, AND/OR CURRENT, AND/OR PREDICTED FUTURE DATA

BACKGROUND OF THE INVENTION

1. Field of the Invention

The present invention is directed to a method, device, and computer readable storage medium that can determine and/or trigger desirable configurations (to the casino) of slot machines based on data. More particularly, the present invention can determine and/or trigger desirable configurations (to the casino) using historical, and/or current, and/or future data relating to the casino, and/or gaming machines, and/or related entities.

2. Description of the Related Art

Electromechanical gaming (slot) machines generate an extraordinary amount of revenue for casinos. Slot machines can be set at different theoretical payouts by modifying their paytables and/or reel weightings (collectively known as the "mathematical model"). Currently, when a casino manager wants to change a model on a machine, the casino manager changes an EPROM on a particular machine with data for a new model. This method requires manual intervention on the part of a slot manager to both decide to change a model and manual labor to change the model.

Therefore, what is needed is a way in an improved system of changing a model which can generate additional revenue for a casino then the manual system.

SUMMARY OF THE INVENTION

It is an aspect of the present invention to provide improvements in slot machine configuration systems.

The above aspects can be obtained by a method that includes (a) receiving usage data from a plurality of gaming machines; (b) determining optimal settings for one or more of the gaming machines; and (c) updating the settings for the one or more gaming machines.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 6 is a block diagram illustrating an apparatus that can be used to implement the present invention, according to an embodiment of the present invention.

DESCRIPTION OF THE PREFERRED EMBODIMENTS

Figure 1:
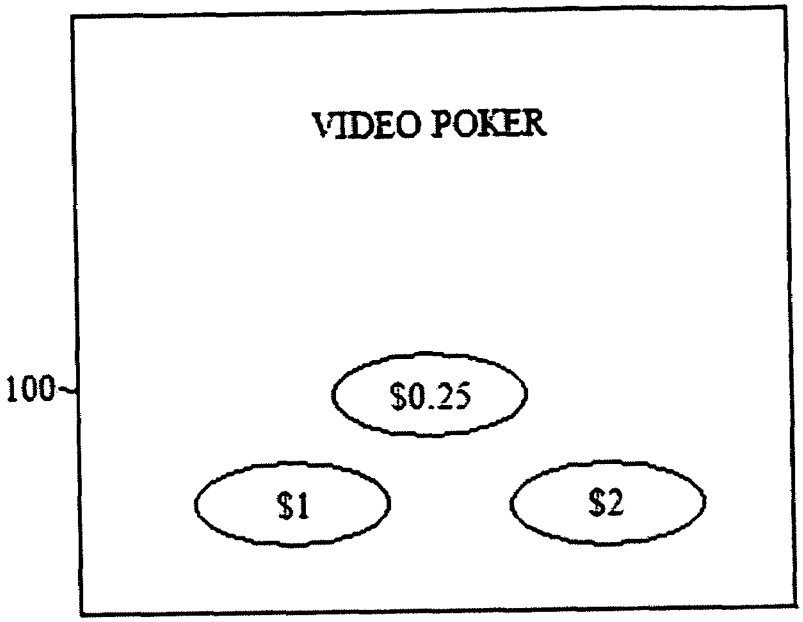
FIG. 1 is a drawing of a screen shot illustrating denominations used for a gaming machine, according to an embodiment of the present invention.
Figure 1:
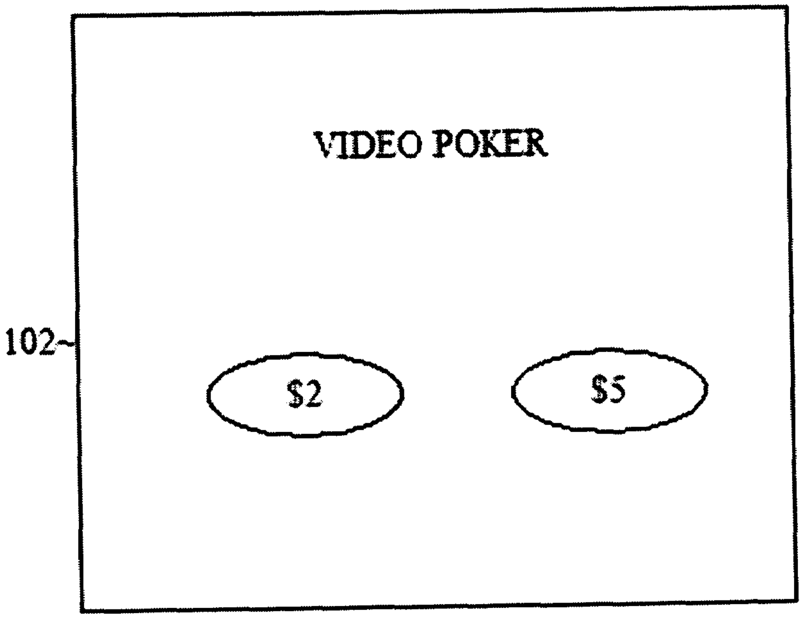

Reference will now be made in detail to the presently preferred embodiments of the invention, examples of which are illustrated in the accompanying drawings, wherein like reference numerals refer to like elements throughout.

The present invention relates to a system for updating configurations of slot machines, either automatically or manually. Slot machines (including video poker machines or any type of gaming device) can be configured in numerous ways. Examples of configurations can include paytables, slot reel configurations (i.e. par sheets), parameters defining a machine's percentage payout, denominations a machine will accept, number and/or design of lines a player can play, or any other known aspect of a slot machine.

Slot machines can be configured/updated via a remote server, as described in U.S. published applications US20020138594, US20020137217, US 20030228912, which are all incorporated herein by reference.

The present invention can be used for automatically determining machine configuration updates. An electronic system can make an automatic determination by analyzing data from a variety of sources and determining desirable settings based on that data. The changes can then be made automatically. Alternatively, the changes can be presented to an operator (such as a slot director) who can then approve the changes before they take effect.

One parameter that can be changed according to the present invention is denomination data for a machine or group of machines. Current gaming machines can operate using a variety of denominations. For example, multiples of $0.05, $0.10, $1, $5, or any monetary amount can be used to play the machines. Typically a player plays a multiple of a particular denomination (i.e. bets 5 $0.05 coins).

During a busy time in a casino, certain players may not be able to get a machine. As gaming demand increases and supply stays fixed, since the casino cannot add or remove machines quickly, a greater percentage of the higher-value players will be unable to play and the casino will not optimize their revenue. As an analogy, when the table games area is sufficiently busy, the casino will raise the minimum wager required to play, e.g. in Blackjack from $5 to $10 per hand, thereby increasing their overall revenue. The present invention enables the casino to similarly raise the minimum wager required to play for slot machines for the same reason. Thus, it may make more business sense to require the current players to bet more. Thus, if current machines have a minimum denomination of $0.05 (a nickel), it might be financially advantageous for the casino to raise that amount to a higher amount (seven cents, a dime, 50 cents, etc.)

Another parameter that may be desirous of increasing is the payout or paytable of the machine. Slot machines contain data which articulate a theoretical percentage return to the player. This typically can range from 80%-101%, although returns falling outside this range are possible as well. The payout can be determined the arrangement of symbols on a slot machine reel, the weights of the reels, payouts on the paytable, etc. A "par sheet" is a specification of particular settings which can designate a machine's return. A return on a video poker machine is typically determined by values on the machine's payout table. For example, different video poker machines can have the returns illustrated in Table I.

TABLE I

| Hand | Machine 1 | Machine 2 |
|---|---|---|
| Royal flush | 800 | 800 |
| Straight flush | 50 | 50 |
| 4 of a kind | 25 | 25 |
| Full house | 9 | 6 |
| Flush | 6 | 5 |
| Straight | 4 | 4 |
| Three of a kind | 3 | 3 |
| Two pair | 2 | 2 |
| Jacks or better | 1 | 1 |

Machine 2 in Table I has a lower return than machine 1 owing to the smaller payout for the Full house and Flush. During a busy time in a casino, changing a poker machine(s) from the machine 1 payout to the machine 2 payout will generate more revenue for the casino if the volume of play does not decrease.

A further parameter that can be changes it the machine's reel configuration. This can include the reel mapping (i.e. number of stops on each reel, the respective symbols on those stops, and the reel weights). The reel mapping typically determines the machines payout percentage. When the reel configuration is changed, a player typically will not be aware of the change (unless the player is actively notified).

Other game machine parameters may also be changed using the methods described herein by the casino in order to further the goals of the casino, for example game play configuration parameters can be changed. For example, for multiline/multicoin games, the number of paylines is usually configurable between five and nine or more. This is also typically true for the maximum allowed coins that can be bet on a single payline. These can be increased or reduced. Some players won't play five lines on a game that lets them play 15, but will play all five lines on a game that only lets them play Another parameter that can be changed using the methods described herein can be progressive award accrual rate. For progressive jackpots, a certain percentage of the casino's hold is escrowed into the jackpot meter for payback to one lucky player. This rate of accrual can be adjusted, thereby affecting both the overall casino hold and the rate of meter increase.

FIG. 1 is a drawing of a screen shot illustrating denominations used for a gaming machine, according to an embodiment of the present invention.

Display output one 100 illustrates a gaming machine with three available denominations, $0.25, $1, $2. Display output two 102 illustrates a gaming machine with two available denominations, $2 and $5. A machine's denominations can be depicted in any other manner as well.

On a busier time in the casino, it may be desirable for the casino to switch from a machine which has the first pictured denominations to a machine which has the second denominations.

It is noted that not all denominations should be used with all models, so part of each model configuration set should be a range of desired denominations. For example, some slot machines have payouts of 1199 coins. This is to avoid the $1200-limit automatic W-2G IRS reporting, but it only makes sense if the denomination is $1 for the machine. If it's a $2 machine, the payout will probably be the more typical 1250 coins (or $2500) since the payout would already be above the limit.

Typically, a single slot model at one point in time has one paytable, one set of reel weights, and one or more allowable denominations. A slot family can be considered to be a set of models that all share the same paytable (listed awards) but not reel weights.

Figure 2:
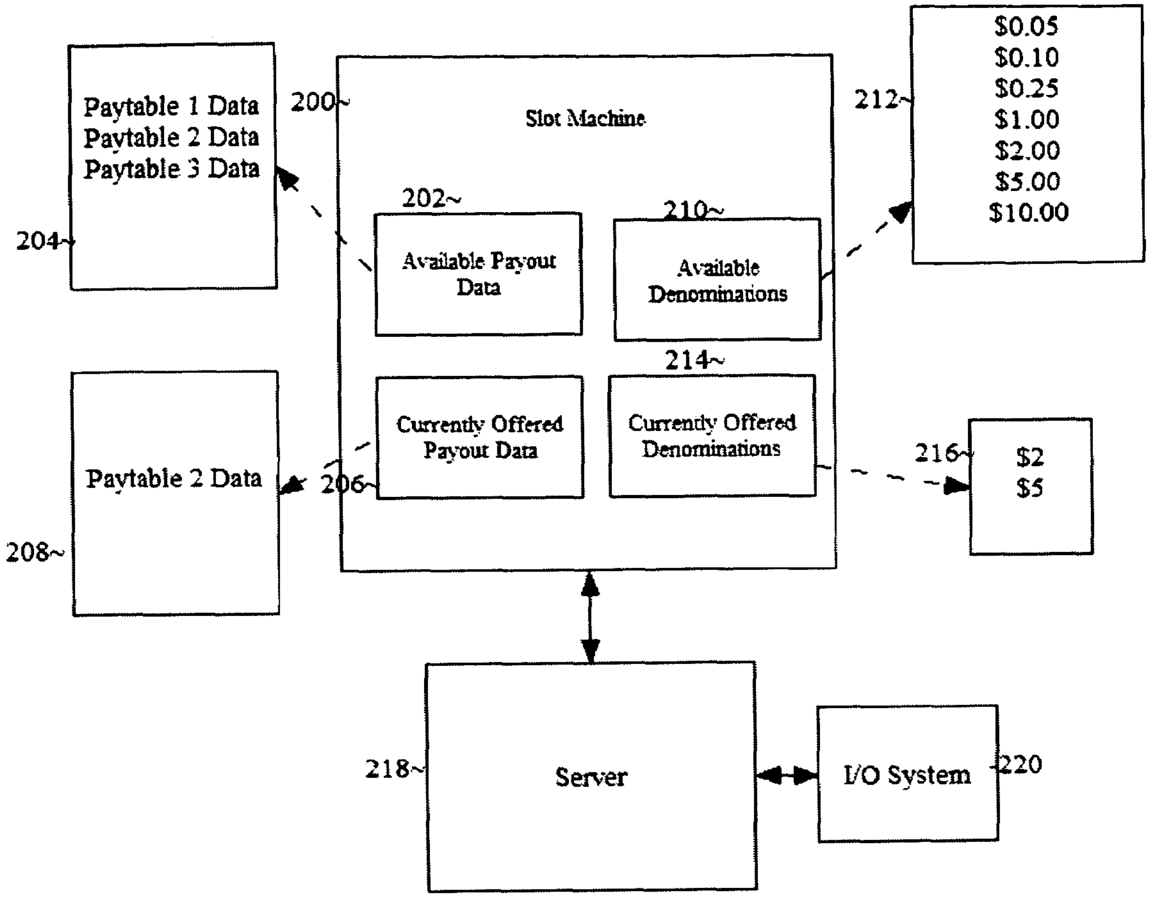
FIG. 2 is a block diagram of networked slot machines, according to an embodiment of the present invention.

FIG. 2 is a block diagram of networked slot machines, according to an embodiment of the present invention.

Slot machine 200 comprises components: available payout data 202, currently offered payout data 206, available denominations 210, currently offered denominations 214. Of course, other components of a slot machine are not pictured, and each of the components illustrated may be optional.

Available payout data 202 is a structure (i.e. table(s), record(s), file(s), etc.) comprising which particular payouts are currently available for use on this machine and their respective data. In this example, the available payout data 202 is for 3 paytables 204, with typically some type of identifier for each.

Currently offered payout data 206 is a structure comprising payouts which are currently offered on the particular machine. Note that what is currently offered may not be the same as what is currently available (i.e. a machine may have data for 5 payouts, but only offers one of these payouts at a given time). In this example, the currently offered payout data 206 is from paytable 2 data 208. The currently offered payouts typically should include only those payouts which are included in the available payout data 202, otherwise the machine would not have the proper data to offer these payouts. The Available payout 202 and the currently offered payout data 206 can also be combined into one structure.

Available denominations 210 is a structure (i.e. table(s), record(s), file(s), etc.) comprising which particular denominations are currently available for use on this machine and their respective data. For example, a gaming machine may have assets to offer denominations of nickels, dimes, quarters, etc. In this example, the current machine offers denominations of 0.05, 0.10, 0.25, 0.50, $1, $2, $5, $10 212. The assets can include graphics which describe these denominations, any code required to process individual denominations etc. Ideally, a machine should be able to have every possible denomination available for use.

Note that not all denominations may make sense with all paytables. Furthermore, in denominations of $10 or higher, slot machines typically list their paytables in dollars, not in coins. The three-7s award for a $500 token machine would be listed as $25,000, not as 500 coins. Thus, the paytable denomination display can also be modified remotely to correspond to the denomination currently being offered.

Currently offered denominations 214 are the denominations that the machine currently offers a player. In this example the currently offered denominations 214 are $2 and $5 216. Typically, this is a subset of the available denominations 210. In this example, the currently offered denominations are $2 and $5 216. The currently offered denominations 214 can be combined with the available denominations 210 into one structure.

A server 218 interfaces with the slot machine 200 (and other machines as well) and can alter each of the data sets described above (this process will be described below in more detail).

An I/O system 220 interfaces with the server 218, which allows an operator (such as a slot manager) to configure the system. Note a connection from one block to another (in this or any other figure), may also include direct or indirect connections to any block within the block pointed to.

Figure 3:
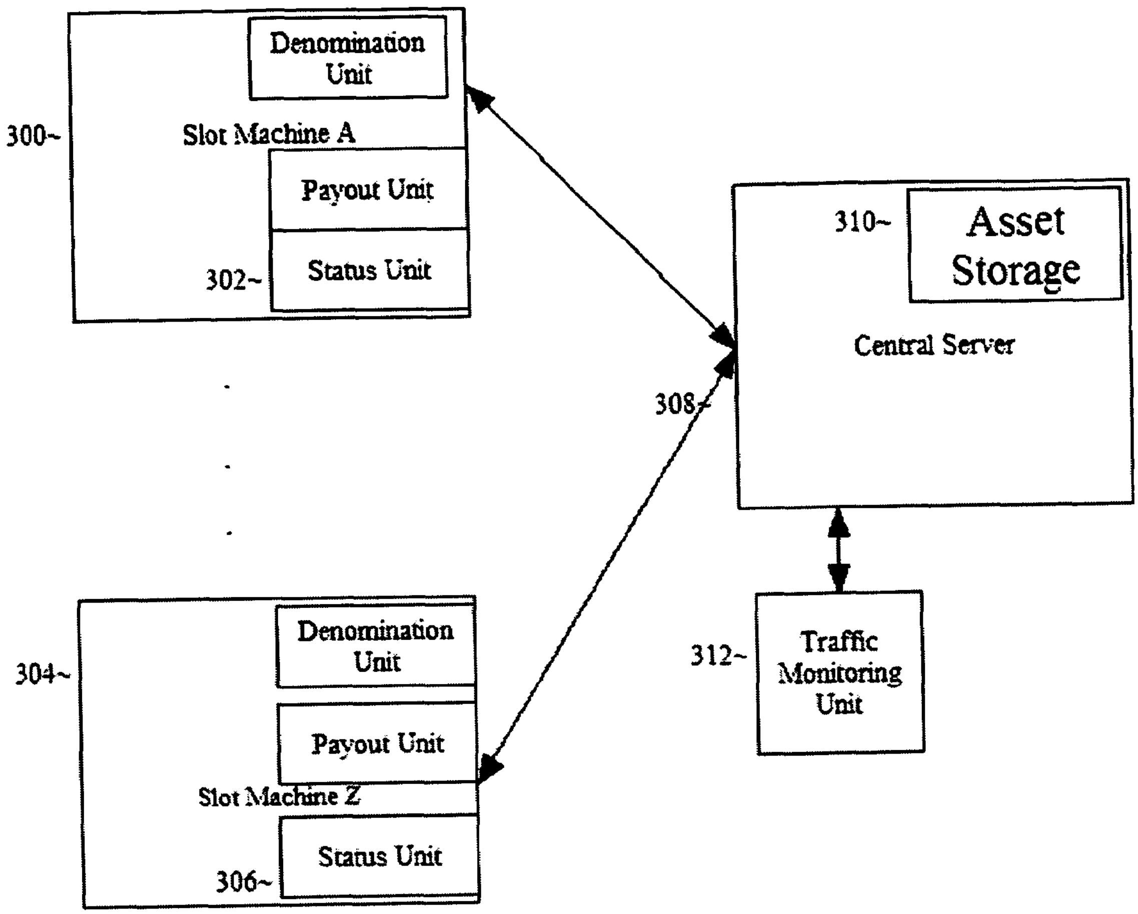
FIG. 3 is another block diagram of networked slot machines, according to an embodiment of the present invention.

FIG. 3 is another block diagram of networked slot machines, according to an embodiment of the present invention.

Slot machine A 300 comprises a denomination unit (which may comprise the available denominations 210, currently offered denominations 214, and any other mechanism to control denomination offerings), a payout unit (which may comprise the available payout data 202, currently offered payout data 206, and any other mechanism to control denominations offerings), and a status unit 302.

The status unit 302 is a unit used to determine and transmit (directly or indirectly) current operating parameters (or usage information/data) of the slot machine 300 to a central server 308. Operating parameters/usage data are any parameters which reflect the current machine's conditions, such as coin in measurements, bet speed, idle time, current player using machine (determined from a player's card if one is used, etc.)

Slot machine Z 304 has a status unit 306 performing the same operations as status unit 302.

Central server 308 comprises an asset storage 310 (or contain a link to one located elsewhere) which stores assets needed for parameter/configuration changes. Such assets can include paytable data, graphic data, software routines, etc.

Central server 308 also receives data from a plurality of machines' status units (i.e. 302, 306), which is used by a traffic monitoring unit 312 (which can be part of the central server 308 or separate connected by a computer communications network).

The traffic monitoring unit 312 can compile and/or tabulate data received from a plurality of status units. For example, the status units can transmit data relating to which machines (or how many, either a number or percentage, of all machines or a given set) are idle. An idle machine can be determined by determining how long it is has been since the machine has been played. If a machine has not been played for more than 20 seconds (or any period of time), then it can be considered idle (except if the player is waiting for a hopper refill).

The status units can also transmit data relating to coin in, such as the time and/or amount of each bet, denominations being played, or any other data relating to such bets, including coin out as well.

The status units can also transmit data relating to which players are playing which machine. This data may be determined if a player is using a slot club (or player's club) card. If a player is not using such a card, it is typically not possible to determine that player's identity.

The status units can also transmit data relating to which assets each machine currently is offering, from the currently offered denominations 212.

The status units can also transmit any data relating to slot machine usage. Historical data may also be maintained and used which contains any parameter and can help in the decision making process. Additional data may be relevant to the decision making process, such as lodging records, restaurant activity, show ticket volumes, etc., as this data my have some relation to the number of players on the casino floor. More on using this data will be described below in more detail.

The traffic monitoring unit 312 receives any combination of data from status units (the data does not necessarily have to be transmitted from status units on slot machine, but can come from any other unit of each slot machine as well). The traffic monitoring unit may tabulate a table (or other kind of record) which may reflect something as illustrated in Table II. Note that the invention is not limited to this structure, and other structures, parameters (including location, etc.), etc. can be used. Note the coin in can be an average of the past hour, the entire day, or any temporal range. The data can be saved as use as historical data, in case the determination software/hardware uses historical data to make a determination as well.

TABLE II

| Machine ID | Status | Denominations | currently played denom | coin in |
|---|---|---|---|---|
| 0001 | in use | $1, $2, $5 | $1 | $99/hr |
| 0024 | idle | $.05, $2 | n/a | $50/hr |
| 0201 | in use | $.05, $.10 | $.10 | $75/hr |

The traffic monitoring unit 312 then processes the data into a form that can be used to make a determination whether to make or recommend making a configuration/parameter change. This process can comprise for example, counting the number of idle machines, averaging coin in, etc. The tabulation can be applied to either the total machines in a casino, or to a particular type/model, or in a particular location in the casino, etc. The data received by the traffic monitoring unit 312 can also be combined with manual or timed event knowledge, for example the fact that a particular fight will be held on a certain night. Thus, any combination of current, past, or predicted future data can be used in a predictive model to make changes in machine configurations. Data about future conditions ("future data") can be data about future events that may affect casino patronage. For example hotel room occupancy levels for a future date, the fact that a big event (such as a show or convention) will be held on a certain date and time, a restaurant that has a large number of reservations for a particular date, a large number of airline bookings for a date, etc.

The processed data can then be subject to a comparison or logical operation in order to make a determination. For example, if the number of idle video poker machines in a particular location (bank) is 0, then a determination can be made that all (or some) of those machines should have a minimum denomination of a particular amount (i.e. $0.10). More than one factor can be used to make such a determination (i.e. if the # of idle machines is greater than a predetermined amount and/or the average coin in is less then a predetermined amount).

The software module used by the traffic monitoring unit 312 can be changed or configured accordingly. An operator, such as a slot manager, can adjust the parameters used therein, or can choose from a number of preconfigured profiles.

Once a determination has been made that certain parameters/configurations are preferred, then machines included in the determination (or machines not included in the determination but still identified in the software module or parameter settings) can be automatically modified. Alternatively, the system can be set as to not make any automatic modifications, but recommend to a slot manager that such changes be made. The slot manager can approve such changes. The slot manager can even be alerted by an automatic page or cell phone call by the system that there are some new recommended changes. Alternatively, the slot manager (or other casino employee) can manually review data (any data described herein, with or without aid of a computer), manually decide on changes to be made, and can manually request such changes.

The changes can be made by transmitted the appropriate data from the central server 308 (as directed by the traffic monitor 302) to the individual machines. For example, if the desired change is that all video poker machines in a certain bank bet set to only have $1 and $2 denominations, then this data is transmitted to the currently offered denominations 214. If an individual machine does not have the assets to offer all of the desired currently offered denominations in the available denominations 210, then the assets can be received from the central server 308 which are stored in the asset storage 310.

As one further example of how this system can work, consider a bank of video poker machines in a busy area of the casino that is very active, and the machines all have denominations available that include $0.05. The system may then recommend to change all or some (for example half, alternating between machines) to have a minimum denomination of $0.10. This may not affect other video poker machines in other parts of the casino. A slow part of the casino may still benefit by having machines with the lower $0.05 minimum denomination.

Paytables can also be adjusted in a similar manner as described above with respect to denominations. During busy times, paytables for video poker and slot machines can be lowered in the same manner. Besides paytables, other parameters affecting payouts can also be adjusted, such as reel configurations, etc.

In this manner, a casino can efficiently maximize profits. Besides performing a tabulation and comparison as described above in order to make a determination about what the optimal settings should be, more complex methods can be used as well. For example, an expert system, neural network based decision system, artificial intelligence based systems, game theory, or any such system/method known in the art can be used. What is input to the system is a set of parameters as described above (any combination of prior historical data, current data, or other predictive or known future data not described, but known in the art), and what is output from the system is a new set of configurations targeted to maximizing the casino's goals. The input data (data to determine the configuration) can include any kind of setting(s) on individual or collective machines themselves (these machines may or may not be targets for configuration changes). For example, if it is determined that a high percentage of machines that have a minimum denomination of $2 are idle (while many other machines not idle have minimum denominations of $0.50), then the determination algorithm may decide to lower the minimum denomination of some or all of $2 machines. The ideal configuration or set of configuration is intended to be more or the most profitable settings. Of course, the new set may not be the actual ideal set of configurations (which may be impossible to determine), but will be ideal as determined by the system. The software used to make these determinations may be complex and sold separately.

A player's "personal worth" can be computed (based on play data, spending habits, or other data obtained such as credit reports, etc).

A machine played by a player with a high personal worth (or a player associated with other people with a high worth) may be adjusted accordingly. For example, the payouts on the machine played by such a player may improve their return rate in order to keep the player's happier than normal. If a husband and wife are registered in the system, and the husband has a large personal worth, then a machine the wife is playing may be automatically (or manually) adjusted to give her a better return to keep her happy. If the wife is happier, then the husband (who has a high personal worth) may be more likely to return to the casino. A machine played by the wife may also give her additional advantages not given to all other players in the casino in order to keep her happy (i.e. allowing her to play at lower denominations, etc.) Machines surrounding a player with a high personal worth can all be adjusted automatically (or manually) to change their settings. When a player inserts his or her players card, the player database can be queried to determine if there is any personal worth information about the particular player, upon which such data can be used to make changes (automatic or manual) to the machine settings as desired by the casino.

Figure 4:
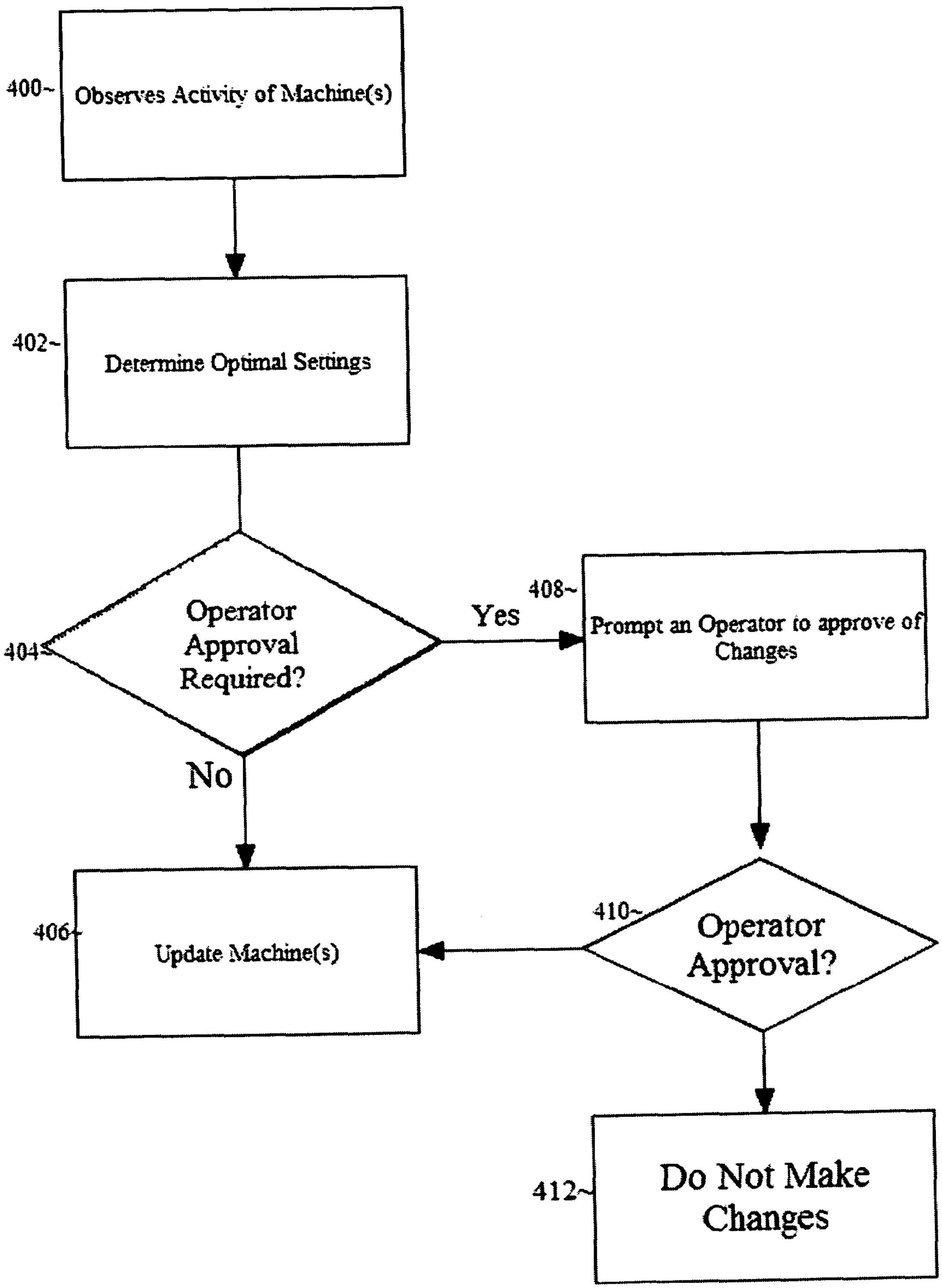
FIG. 4 is a flowchart illustrating a method of using an automated decision process in changing gaming machine settings, according to an embodiment of the present invention.

FIG. 4 is a flowchart illustrating a method of using an automated decision process in changing gaming machine settings, according to an embodiment of the present invention.

The method starts with operation 400, which observes activity of a machine or set of machines. The set of machines is determined by a decision module typically running in the traffic monitoring unit 312, although it can run anywhere else as well.

From operation 400, the method proceeds to operation 402, which determines optimal settings. This can be done by the decision module using methods described herein. The optimal settings can include individual machines and settings for those individual machines. It is noted that the optimal settings may decide to change some of the machines, but not all, and the changes do not have to be uniform across machines.

It is also noted that the method described herein does not need to implement operation 400 but can start at operation 402. For example, configurations can changed based on predictions or knowledge about future conditions, for example a big sporting event occurring.

Operation 402 may take into consideration additional information besides current conditions, such as historical data and future predictions. More on combining these types of data into a determination of configuration settings will be described below in more detail.

From operation 402, the method proceeds to operation 404 which determines if operator approval is required. This parameter would typically be set in a parameter/configuration file used by the decision module (which would typically can other parameters used by the system as well).

If operator approval is not required, then the method proceeds to operation 406, which updates the targeted machines. Any feature of the machine can be updated using the methods described herein. The machines are updated using the methods described herein. It may also be necessary to query a machine first to determine if the machine has the proper assets needed to make the change. For example, if a denomination of $1 is offered, and the software is intended to display a graphic of a "$1," then an image file is a needed asset. If the available denominations 210 do not indicate the machine is ready for handling a "$1," denomination, then the proper asset(s) should be transmitted to the gaming machine from the central server 308. Payout, paytables, par sheets, graphical or video elements, audio elements, etc, all may be needed assets to make a change.

If the determination in operation 404 determines that operator approval is required to make the desired changes, then the method proceeds to operation 408, which prompts an operator to approve the changes. The prompting can be done via an output device such as a CRT. Optionally, an operator can be alerted by a cell phone call, paging device, or other manner to reach the operator. The operator can review the specified changes and then approve or reject them, or approve some of the changes but not all. For example, the outputted optimal changes may suggest changing all machines to a high denomination, but the operator may wish to preserve a few machines at a low denomination as to not annoy some customers which insist on only playing low denomination machines and may leave the casino otherwise. Typical graphical user interface (GUI) techniques can be used to receive approval/changes from the operator.

The method then proceeds to operation 410, which implements the operator's decision by continuing the method to operation 412 if the operator rejected the changes. In operation 412, the changes are not made.

If the operator approved of the changes, then the method proceeds from operation 410 to operation 406 which makes the changes. If the operator approved only some of the changes or altered the determined optimal changes, then operation 406 will make the changes desired by the operator.

One issue that may arise is if a player is playing a machine and a parameter which is discernable (or even not discernable) to the player is changed while the player is playing. For example, if a player is playing a gaming machine at the $0.05 denomination level, and the machine is suddenly raised to $0.10, the player may get mad. Changing a paytable may have the same effect. Some changes (such as payout percentage changes) may not be discernable to the player and thus a change may not be an issue that need be addressed to the player.

If the change should be addressed to the player, a notice that a change is being made may be displayed to the player on the gaming machine itself. Alternatively, the machine/system can wait until the current player leaves the machine before effecting such a change. This can be determined either by observing an idle time in the machine, or when a player removes his or her players card from the machine (or associated apparatus), or cashes out of the machine. None of these methods may be foolproof, as a new player may wish to play a machine immediately after a previous player leaves (hence there will be no idle time). Further, not all players use player cards. Using a written notice (or any of these other options) should be at the discretion of the casino operators and can be configured depending on their preferences.

Figure 5:
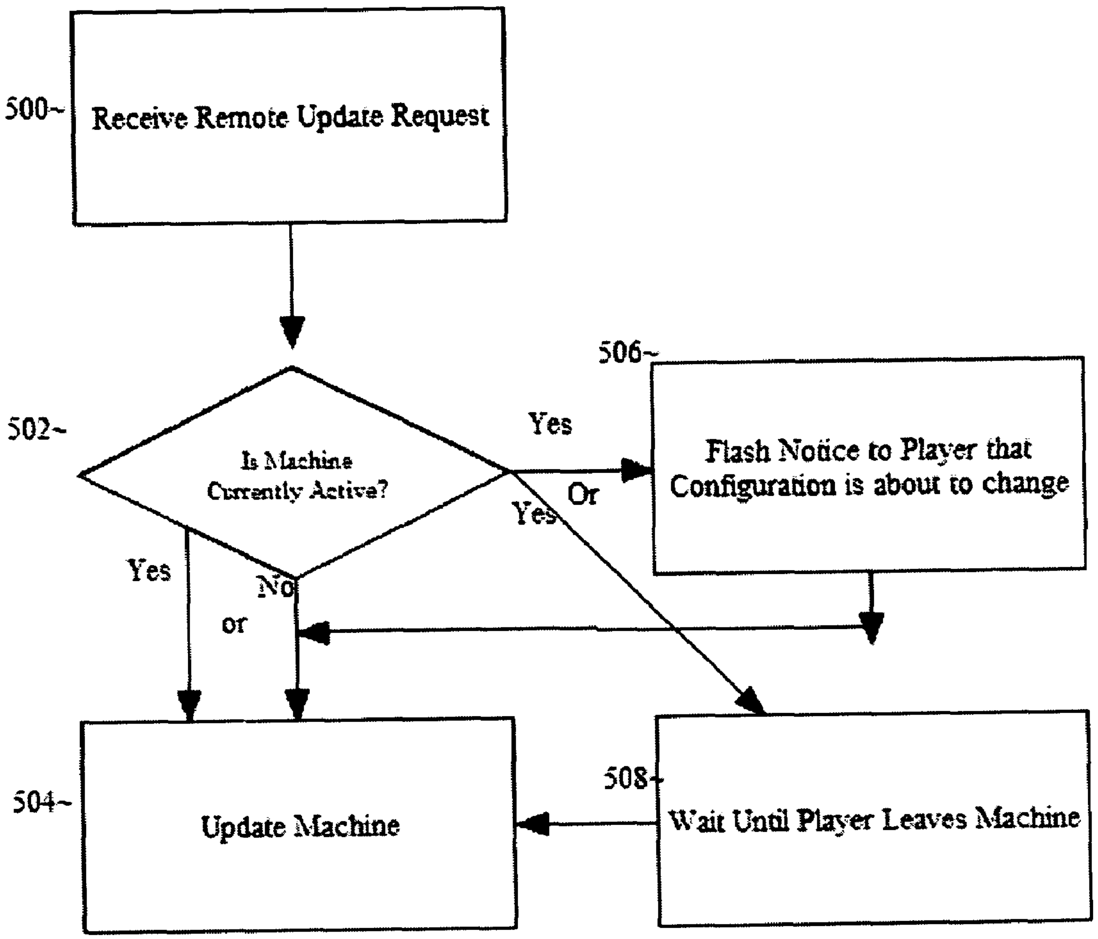
FIG. 5 is a block diagram illustrating a method of remotely changing gaming machine settings, according to an embodiment of the present invention.
Figure 6:
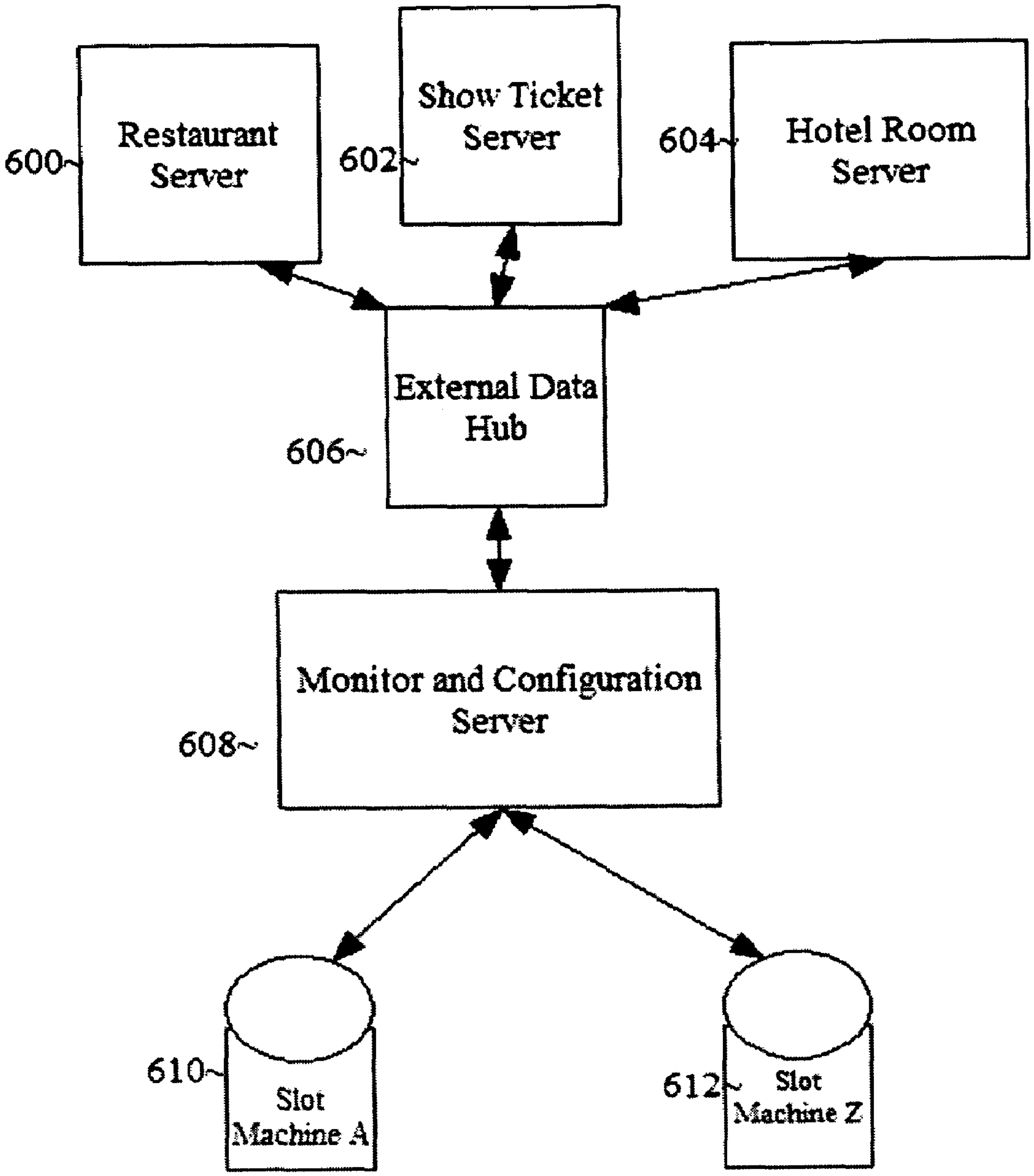
FIG. 6 is a block diagram illustrating an apparatus that can be used to implement the present invention, according to an embodiment of the present invention. Slot machine A 610 and slot machine Z 610 are connected to monitor and configuration server 608. Monitor and configuration server 608 is connected to external data hub 606, which is connected to restaurant server 600, show ticket server 602, and hotel room server 604.

FIG. 5 is a block diagram illustrating a method of remotely changing gaming machine settings, according to an embodiment of the present invention.

The method starts at operation 500, which receives a remote update request. The remote update request is typically received from the central server 308, and tells a machine to update a particular setting or settings.

From operation 500, the method proceeds to operation 502, which determines if the machine is currently in used. This can be determined by whether a predetermined period of time has elapsed after the last time the machine has been played and the credit balance is zero. However, this should typically not include a case where a machine is sitting for several minutes while a jackpot hand pay is delivered to the player. If the machine is not currently in use, then the method proceeds to operation 504 which updates the machine.

If the machine is currently in use (from operation 502), then the method can proceeds to operation 506 which flashes a notice to the player that a setting is about to change. For example, messages such as, "this machine will no longer accept nickel bets," or "the paytable on this machine has now changed" can be displayed. The method then proceeds to operation 504, which updates the machine.

If the machine is currently in use (from operation 502), then the method can alternatively proceed (depending on a configuration setting) to operation 508, which waits until the current player leaves the machine before making the change. When a player leaves a machine can be determines by the methods above.

Alternatively, the method can proceed from operation 502 to operation 504 without informing the player. If the change is an update in reel weights (or other transparent change), then the player will typically not even realize a change has been made.

In addition, other sequences for FIG. 5 can be used as well. For example, all machines can be configured to display a notice when a parameter has changed whether the machine is active, or any other logical rearrangement of the sequence. What is important is that the operators/designers the system can configure the machines to address the issue of parameter changes and user notification as they prefer.

In a further embodiment, configurations/settings of a machine can be adjusted according to a current time/date. For example, on a particular date/time (i.e. Friday night at 8 pm), machines can then be set to have higher denominations or lower payouts.

The determination of optimal settings 402 can also incorporate machine activity and the current time. Thus, the automatic system may be set to automatically change parameters at a particular time, but if machine activity is unusually low, then the change may not be made (or if it has been made, the settings can revert back to their former settings or other optimal settings determined in operation 402).

One or more numerical value(s) can be associated with a casino's current conditions. For example, a numerical value can represent a percentage of a casino's machines (either all of the machines, or some of the machines (grouped by model, physical location, etc.)) that are in use (or idle).

A numerical value can also represent any combination of: the number of average coins being bet per time interval (i.e. coins/hour), the average (or total) number of lines being bet (or lines being bet/total available lines), the average (or total) number of coins bet (or coins bet per line), or any other measure of a player's choices when playing a gaming machine.

These numerical value(s) can then be used to choose an appropriate slot configuration. For example, if just the percentage of a casino's machines that are idle is being used, then this number can be used to select appropriate configurations.

Gaming device configurations can be stored in files and there can be a plurality of configuration files for particular models of a machine. For example, a particular slot machine (i.e. "Grizzly Slots") may have three configuration files which configure the machine's reels (i.e. reel mapping, weights, etc.) Each of these files can have a payout percentage associated with them and also an optional category. Table II illustrates a table of configuration files.

TABLE II

| Slot Machine | Category | Payout % | Filename |
|---|---|---|---|
| Grizzly Slots | A | 98% | GrizzlyA.cfg |
| Grizzly Slots | B | 97% | GrizzlyB.cfg |
| Grizzy Slots | C | 95% | GrizzlyC.cfg |
| Lucky 7's | A | 96.5% | Lucky7B.cfg |
| Lucky 7's | D | 93% | Lucky7D.cfg |

From Table II, there are two models of slot machines, "Grizzly Slots," and "Lucky 7's." There are three configuration files for Grizzly slots (GrizzlyA.cfg, GrizzlyB.cfg, GrizzlyC.cfg). Category A has the highest return at 98%, while category B and C have returns of 97% and 95%, respectively. The Lucky 7 machine has files for two categories, A and D.

Once a numerical value (or values) representing a measure of casino conditions (either current or predicted) has been computed, then returns of gaming machines can be adjusted so that the casino can ideally optimize their profit. If a machine returns too little to a player, then the player may lose his or her money too quickly and not play more or (even worse) not return to the casino at a later time. If a machine returns too much, the casino of course will not make as much money. When a casino is busier, it is typically in the casino's interest to reduce the player return slightly (or raise minimum bets accepted or lines to be played, etc.) This is because if a player loses his or her money too quickly and decides not to play, then there are many other players which can occupy the machine.

Thus, a measure of casino conditions can represent a measure of a business of a casino. The measure can then be translated into a category in order to select particular configuration files.

For example, suppose a casino uses the percentage of idle machines as the basis for modifying machine settings (although of course any other criteria or combination of criterion can be used). This number can then be translated into a category using a table such as that illustrated in Table III.

TABLE III

| Measure Value | Category |
|---|---|
| >25% | A |
| 10%-15% | B |
| <10% | C |

Thus, note that from Table III, that if the measure (in this example the number of idle machines) is greater than 25%, then category A can be invoked, which has the highest payouts. If the number of idle machines falls between 10% and 15%, then category B is invoked which typically has lower player returns than category A. If the number of idle machines is below 10%, then category C is invoked which has the lowest player return.

Categories are helpful because it may not be possible to set a machine's payout return at any arbitrary return. This is because a machines reel configuration must typically be approved by a regulatory body, so when a final measure or measures of a casinos conditions are determined, the measure(s) should be translated into a category to change the machine configurations.

Note that changing the machine configurations based on casino conditions is not limited to the payout return predicated on the reel configurations (reel mappings, weights, etc.) Configuration files can also include all machine configurations discussed herein (or known in the art), including lines available, minimum coins required per line, maximum coins required per line, payouts, etc.

When a measure of current casino conditions is used as part of a predictive model, the current casino conditions may incorporate a running average of a duration of time. For example, the conditions may consider a running average of the previous two hours (or any amount of time).

A predictive model can also be used which incorporates historical data into the measure of casino conditions (or casino activity). Using historical data may provide a basis for a casino to predict casino activity on a particular date/time. For example, when determining settings to use for Jul. 4, 2004, historical data can be used from Jul. 4, 2003 (and possibly July 4's from other years as well).

A measure from the historical data can be used as the factor(s) when determining machine configurations. Alternatively, historical data can be combined with present data to determine machine configurations.

For example, on Jul. 4, 2004, the monitoring unit 312 determines that the current percentage of idle machines is 15% (C). A historical database determines the percentage of idle machines on Jul. 4, 2003 (H). These values can be combined to produce a combined measure which can be used to select machine configurations. For example, these two values can be combined using the following formula:

$$M=a*C+b*H,$$

wherein M is the measure to be used, a is a weighting factor for the current condition, and b is a weighting factor for a historical condition.

For example, if on Jul. 4, 2003, 15% of machines were idle (H), and on Jul. 4, 2004, 10% of machines are idle (C), and a=0.7 and b=0.3 (these can be set by the operators as desired), then M=0.115. This value (M) can then be used to select machine configurations.

Note that the above example simply used the factor of idle machines as a measure, but many more factors can be combined into the final measure. For example, both idle machine percentage as well as percentage of available lines played can be incorporated into a measure of casino activity. These can also be combined using a weighted average. Note that linear formulas are used in the above examples for simplicity, but any other kind of formulas (i.e. non-liner, differential, etc.), matrix, etc. can be used.

Further, it is not necessary to use the same activity factors for the present data and the historical data. For example, the present casino measure may be limited to the percentage of idle machines. However, the historical casino measure may incorporate many other aspects of casino activity.

Further, additional data besides casino activity can be incorporated into the model. For example, hotel reservation data can be used to predict casino activity. If on a future date, all rooms are booked, then it can be predicted that the casino will have high traffic on that day/night. The hotel reservation data can also be used on a current date to help determine a measure of a casino traffic.

For example, suppose a casino configuration is to be determined one day in advance (i.e. not considering the current casino activity, although this can be considered as well) for Jul. 4, 2004. The historical usage data can be retrieved for Jul. 3, 2003 (and possibly previous years and/or dates adjacent to this date). A measure to be used when determining machine configurations can be computed as follows:

$$M=x*R+y*H,$$

wherein R can be the percentage of rooms reserved on Jul. 4, 2004, H is a measure of historical data for Jul. 4, 2003, and x and y are respective weighting factors.

In this manner, historical data can be used to set machine configurations in combination with known occupancy data for a future date. In addition, on Jul. 4, 2004, the current casino conditions on that date can also be incorporated into the model in order to possibly further adjust machine configurations.

It is also noted that the weighting factors (x,y) can also change depending on any of the data described herein. For example, when usage data is below previous corresponding historical data (i.e. perhaps due to changes in the economy travel to the casino has slowed), then historical data may have less relevance and thus can be given less weight.

In addition to hotel occupancy data, other hotel data can be incorporated into the model as well. For example, restaurant data can be used as well. If a restaurant is fully booked (especially one inside or near a casino), then this can be predictive of heavy casino traffic. Machines near the restaurant may be set at a configuration to exploit the heavy traffic in that area. In addition, data from a casino theatre can be used similarly. If a show is fully booked, then this can also be predictive of heavy traffic (possibly after the show is over).

It is noted that all of the machines in a casino do not need to be adjusted according to the same model. For example, models can be segregated into different casino locations (or different machine models, etc.) Data that goes into a model can be limited to relevant data. For example, a particular bank of machines in a busy traffic area of the casino is being modeled. The historical data for this model would be limited to this bank of machines. If current usage data is being used for the model as well, then the current usage data would be limited to these particular machines (or even a single machine). Some other data may not need to be limited (for example hotel occupancy data).

As a further example, consider a bank of video poker machines in a casino (although any type of gaming machine can be targeted). The casino wishes to raise the minimum coinage from the 0.25 level on some or all of the machines in the bank, when the bank is busy enough to support such a raise. The relevant data can be chosen to be: the percentage of video poker machines of the bank at the 0.25 coinage level that are currently idle (C1), the percentage of video poker machines in the entire casino floor (or alternatively all or some machines but for those included in C1) at the 0.25 coinage level that are currently idle (C2), the historical percentage of machines at the 0.25 coinage level that were currently idle on the same night one year ago (H), and the current hotel occupancy rate (O).

The relevant selected data (C1, C2, H, and O) can be used in the determination. One simple formula can be as follows:

$$M=a*C1+b*C2+c*H+d*O,$$

wherein a, b, c, and d can be weights associated with C1, C2, H, and O, respectively.

If M falls within a predetermined (or computed) range (or is higher or lower than a predetermined or computed threshold), then the present invention can raise the minimum coinage level on some (one, some, all, etc.) of the video poker machines to be $0.50 (or any other denomination) as opposed to $0.25.

Thus, basically the above determination is made to raise a machine's or machines' coinage level when the bank of machines are currently busy (i.e. none or few idle machines), the remaining machines are also busy (although perhaps less busy than the particular bank in question), historically machines on this night are busy, and the hotel has a high occupancy rate. The determination can be limited to simply taking into consideration current usage data of the machines (i.e. the number of idle machines in the bank, or an relevant usage data). The additional factors may also be considered which may in some instances provide a more powerful model to make the determination. For example, if the bank of machines is currently busy, but the hotel has a very low occupancy rate, it may be assumed that the current busyness is just temporary and the current population in the property may not support raising the denominations on some or all of these machines. Additionally, on slow nights (such as weeknights, periods where there is no major event, or just a period with relatively low visitors), players may expect to see lower minimums, and thus raising the minimums may upset some players. Taking into consideration the historical data can in some cases "normalize" the current usage data. For example, if a casino is currently experience heavy machine traffic, but historically the date in question has had low machine traffic, then raising the minimums may not be optimal because the current high traffic may just be a result of the variance of the randomness of casino patrons which may subside in the near future (i.e. next 30 minutes).

It is further noted that all data mentioned herein (i.e. historical, current, future), and respective subdata (i.e. specific data such as lines being played, etc.) can all be used in any combination in a model, and in any way. For example, neural networks, expert systems, genetic algorithms, etc, can all read in inputs and produce desired configuration settings. A desired configuration setting is one which is predicted to achieve a goal of the casino operators. Typically, this would mean increasing profits (both short term and long term), but can also include other casino goals such as improving player loyalty. However, there is no guarantee that the desired settings may be the optimal settings or the settings which would result in the most profits. It may be difficult, if not impossible, to determine the true optimal settings in order to obtain the theoretical maximum for the casino's goals.

The historical database can typically store many (or all) of a machines usage data, such as idle time, time played, cash deposited, lines played, etc. This data can be stored for each machine and/or tabulated to produce overall data for all (or groups) of the machines. The historical data can also include the machine's configuration settings alongside the respective usage data. In this way, this data can be analyzed to produce improved models. For example, if a machine is getting a lot more cash deposits when a player return is relatively lower (as indicated by the historical configuration settings), then this data can be used when designing additional models.

It is also noted that any and/or all of the above embodiments, configurations, variations of the present invention described above can mixed and matched and used in any combination with one another. Any claim herein can be combined with any others (unless the results are nonsensical). Further, any mathematical formula given above also includes its mathematical equivalents, and also variations thereof such as multiplying any of the individual terms of a formula by a constant(s) or other variable. Further, the operations described herein and illustrated in the flowcharts can be performed in any possible order.

Moreover, any description of a component or embodiment herein may also include hardware, software, and configurations which already exist in the prior art and may be necessary to the operation of such component(s) or embodiment(s).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising:

detecting coin in data or idle machine data for at least two gaming machines in a hotel;

computing a measure value for the at least two gaming machines using the detecting;

retrieving hotel occupancy data for the hotel;

determining a gaming machine configuration for a particular gaming machine in the hotel using both the hotel occupancy data and the measure value; and remotely updating the particular gaming machine so that the particular gaming machine uses the gaming machine configuration.

2. The method as recited in claim 1, wherein the gaming machine configuration comprises a minimum accepted wager amount.

3. The method as recited in claim 1, wherein the gaming machine configuration comprises a particular paytable.

4. The method as recited in claim 1, wherein the gaming machine configuration comprises reel mappings.

* * * * *